(12) United States Patent
Speiser

(10) Patent No.: US 12,313,498 B2
(45) Date of Patent: May 27, 2025

(54) CHASSIS DYNAMOMETER

(71) Applicant: Richard Speiser, Boerwang (DE)

(72) Inventor: Richard Speiser, Boerwang (DE)

( * ) Notice: Subject to any disclaimer, the term of this patent is extended or adjusted under 35 U.S.C. 154(b) by 254 days.

(21) Appl. No.: 18/079,087

(22) Filed: Dec. 12, 2022

(65) Prior Publication Data

US 2023/0184629 A1 Jun. 15, 2023

(30) Foreign Application Priority Data

Dec. 13, 2021 (DE) ...................... 10 2021 132 845.4

(51) Int. Cl.
*G01M 17/007* (2006.01)
*G01M 17/02* (2006.01)

(52) U.S. Cl.
CPC .... *G01M 17/0074* (2013.01); *G01M 17/0076* (2013.01); *G01M 17/022* (2013.01)

(58) Field of Classification Search
CPC ......... G01M 17/0074; G01M 17/0076; G01M 17/022; G01M 9/04; G07B 15/02
See application file for complete search history.

(56) References Cited

U.S. PATENT DOCUMENTS

| | | | | |
|---|---|---|---|---|
| 3,686,776 A | * | 8/1972 | Dahl | G01M 17/0076 434/61 |
| 3,940,978 A | * | 3/1976 | Akkerman | G01L 3/242 73/116.09 |
| 9,396,667 B1 | * | 7/2016 | Bober | G09B 9/058 |
| 2015/0346051 A1 | * | 12/2015 | Magee | G01L 5/133 73/147 |

FOREIGN PATENT DOCUMENTS

| | | |
|---|---|---|
| CH | 137231 A | 3/1930 |
| EP | 0121186 A1 | 10/1984 |
| ES | 2910176 T3 * 5/2022 | ........... B61B 12/007 |

OTHER PUBLICATIONS

German Office Action for corresponding DE application No. DE 10 2021 132 845.4, dated Dec. 13, 2021.

* cited by examiner

*Primary Examiner* — Kristina M Deherrera
*Assistant Examiner* — Gedeon M Kidanu
(74) *Attorney, Agent, or Firm* — Notaro, Michalos & Zaccaria P.C.

(57) ABSTRACT

A chassis dynamometer for motorcycles with a combustion engine, having a mounting unit, at least one fastening unit, an operating unit, a control unit and a roller for recording the peripheral speed of a motorcycle rear wheel is disclosed. The chassis dynamometer has a flow unit a drive unit, a diffuser and an outflow unit arranged downstream of the diffuser in the direction of flow where the diffuser and outflow unit form a flow channel carrying gas in the operating state, wherein the diffuser can be driven by the drive unit, where the control unit controls the drive unit as a function of the peripheral speed of the roller in such a way that a speed of the gas emerging from the outflow unit in the operating state is substantially equal to the peripheral speed at least from a peripheral speed of 150 km/h.

9 Claims, 3 Drawing Sheets

CHASSIS DYNAMOMETER

Figure 1:
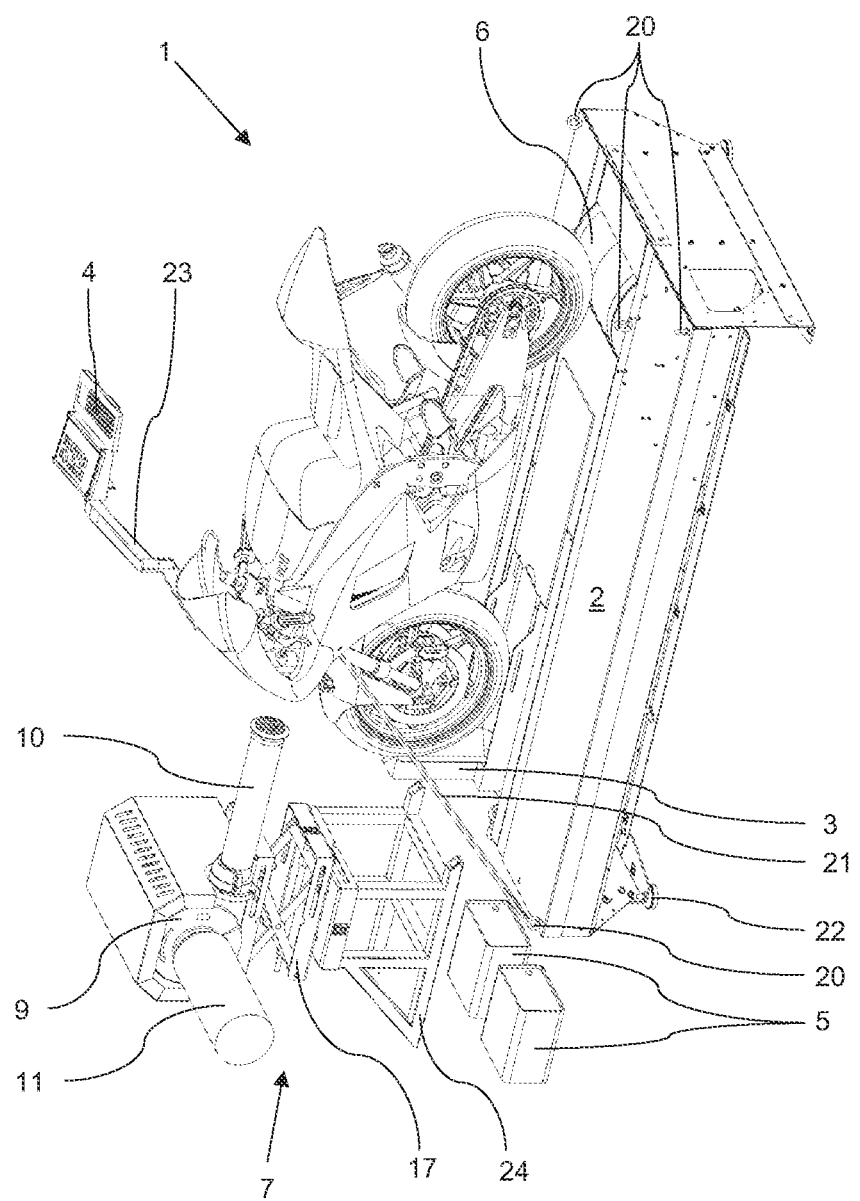

The present invention relates to a chassis dynamometer for motorcycles with a combustion engine, having a mounting unit, at least one fastening unit, an operating unit, a control unit and a roller for recording the peripheral speed of a motorcycle rear wheel, wherein the chassis dynamometer has a flow unit, as well as a method for the inflow of gas towards a motorcycle with a combustion engine on a chassis dynamometer.

In order to optimise the tuning of all units of a motorcycle with an internal combustion engine, chassis dynamometers are known, by means of which real driving is simulated in a fixed location. The measured values required for tuning are recorded via sensors and displayed or further processed in real time. It is also known to fit a motorcycle with a sensor box for recording measured values during road travel. However, this is disadvantageous as real-time measurement is more difficult by design and sensors as well as the motorcycle and rider are exposed to environmental influences that are often dangerous, which can lead to damage or even injuries.

For performance enhancement, sports bikes often have an airbox, which is arranged in the front portion of the motorcycle and absorbs a dynamic pressure generated by the airflow from a peripheral speed of the wheels of around 150 km/h in order to optimise the injection into the engine. Such performance enhancement cannot be simulated on a conventional chassis dynamometer meaning that optimum tuning of the units of a motorcycle is not possible.

In the state of the art, wind tunnels are known for the reproduction of air resistance and dynamic pressure, into which the entire chassis dynamometer including the motorcycle is inserted. These wind tunnels require a lot of space, are costly and cannot produce quick changes in air flow.

The object of the present invention is therefore to propose a chassis dynamometer for motorcycles with a combustion engine that is dynamic, space-saving and cost-effective and reproduces reality as accurately as possible.

This object is achieved by means of a chassis dynamometer for motorcycles with a combustion engine, having a mounting unit, at least one fastening unit, an operating unit, a control unit and a roller for recording the peripheral speed of a motorcycle rear wheel, wherein the chassis dynamometer has a flow unit, which in turn has a drive unit, a diffuser and an outflow unit arranged downstream of the diffuser in the direction of flow, wherein the diffuser and outflow unit form a flow channel carrying gas in the operating state, wherein the diffuser can be driven by the drive unit, wherein the control unit controls the drive unit as a function of the peripheral speed of the roller in such a way that a speed of the gas emerging from the outflow unit in the operating state is substantially equal to the peripheral speed at least from a peripheral speed of 150 km/h.

The mounting unit is advantageously designed in such a way that all components of the chassis dynamometer and a motorcycle can be arranged or mounted on it in the operating state, wherein the motorcycle can be fixed by means of the at least one fastening unit. The fastening unit holds the front wheel of the motorcycle in the operating state and thus prevents it from rolling away. The operating unit defines the Human Machine Interface, wherein this passes on the signals input by a user to the control unit and the control unit controls a plurality of units of the chassis dynamometer. The roller advantageously has a surface roughness that is similar to that of a normal road and is mounted in such a way that the rolling resistance and the rolling characteristics of the rear wheel on it are as close as possible to reality. In an advantageous manner, the axes of rotation of the rear wheel and roller are arranged parallel to each other, particularly preferably the two axes of rotation lie in a common purely vertical plane. An oblique arrangement of the two axes of rotation relative to each other is also in accordance with the invention, in particular in order to simulate a driving scenario with an incline or a curve. The flow unit particularly advantageously simulates the air resistance reaching the motorcycle in reality by moving a gas towards a stationary motorcycle instead of moving the motorcycle in ambient air. This simulates the dynamic pressure in the airbox. A gas flow is generated by means of the diffuser driven by the drive unit. The gas flow escapes into the environment via the outflow unit. The peripheral speed of the roller is calculated via the angular frequency of the roller measured by a sensor, preferably a rotary encoder. This corresponds to the peripheral speed of the motorcycle rear wheel. As the motorcycle is stationary, the air resistance to be simulated must be completely transferred to a speed of the gas exiting the outflow unit such that the speed of the escaping gas corresponds to the peripheral speed. A deviation of the speed of the escaping gas from the peripheral speed of no more than 5%, advantageously of no more than 3.5%, particularly preferably of no more than 1% is likewise in accordance with the invention. Owing to the increasing influence of the air resistance with increasing peripheral speed, such accuracy is advantageous from a speed of 150 km/h. According to the invention, it is also possible to control the escaping gas speed as a function of the peripheral speed of the roller over the entire peripheral speed spectrum. A cascade control device or frequency converter are provided in the control unit for this purpose.

In a further development of the invention, it is envisaged that the flow unit has a filter unit arranged upstream of the diffuser in the direction of flow, wherein the filter unit and/or the outflow unit can be releasably connected to the diffuser. The filter unit is advantageously formed as a particle filter so that the diffuser does not get stuck due to dirt accumulation and the susceptibility to malfunctions is reduced. The filter unit forms part of the flow channel carrying gas and is arranged on the diffuser in such a way that the gas flow reaches the diffuser directly and without any curves as far as possible, i.e. with as little flow loss as possible. The entry of the gas through the filter is advantageously facilitated so that a drive unit for driving the diffuser can be selected to be as small as possible, which advantageously reduces the installation space as well as the costs. The filter unit and/or the outflow unit can be releasably connected to the diffuser for replacement or maintenance. The releasable connection is preferably formed via a clamp connection, which has a circumferentially uniform connection. Another type of positive or non-positive connection is also in accordance with the invention.

The outflow unit preferably has a circular cross section and length of at least 0.3 m, preferably at least 0.5 m. Such a design is advantageous because it calms the gas flow and ensures that the gas exits the flow unit evenly. The longer the outflow unit, the lower the proportion of turbulent flows that may occur. Otherwise, an outflow unit with the shortest possible length is useful for keeping the installation space as small as possible. In accordance with the invention, the outflow unit therefore has a maximum length of 3 m, preferably of 2 m, particularly preferably of 1.5 m.

In one embodiment of the invention, it is envisaged that the outflow unit has a laminar filter, wherein the laminar filter is arranged at an end of the outflow unit away from the diffuser, wherein the laminar filter or the outflow unit has a curved surface at a gas outlet end. The laminar filter advantageously calms the gas flow in addition to the outflow unit, wherein the laminar filter advantageously has several passage openings arranged parallel to the gas flow. The laminar filter has at least 10%, advantageously at least 20%, particularly advantageously at least 30% of the length of the outflow unit and can be accommodated therein. The gas outlet end has a curved surface in order to optimally transport turbulence that arises when the gas exits the flow unit to the outside due to the flow break-off in order to leave a main gas flow directed at the motorbike, which is in an operating state on the chassis dynamometer, unaffected by this.

In addition, at least one seal unit is advantageously arranged between the filter unit and diffuser and between the diffuser and outflow unit. The seal unit prevents unfiltered gases from entering the flow channel so that turbulence caused by cross-flows entering the flow channel is also avoided. The at least one seal unit is arranged and formed in such a way that it does not influence the gas flow. It is formed in particular as an annular seal with an identical internal diameter as the units connected to it. The at least one seal unit is advantageously made of rubber, in particular BR, NBR or EPDM, and can be arranged on the adjacent units by means of a positive and/or non-positive fit.

In a further development of the invention, it is envisaged that the control unit has a frequency converter, wherein the frequency converter is calibrated in a range of peripheral speed from 150 km/h to 350 km/h, advantageously from 200 km/h to 300 km/h, particularly advantageously to 250 km/h. A frequency converter is cost-effective and has a small installation space. The use of the calibrated peripheral speed of 250 km/h is advantageously located in a middle speed range between a lower range, from which the speed of the escaping gas exerts a noteworthy influence on the motorcycle in the first place, and an upper range, which represents the maximum peripheral speed of the motorcycle rear wheel.

Furthermore, the filter unit is advantageously formed as a pleated element filter, in particular as a cartridge filter. Pleated element filters, in particular cartridge filters, have a very large filter surface with a small installation space. These filters are also commercially available in all formations and replacing them for maintenance of the flow unit is accordingly simple and cost-effective.

In one embodiment of the invention, it is envisaged that the flow unit has a positioning unit, wherein the positioning unit has a height unit for adjusting the height and a depth unit for adjusting a distance between the flow unit and a motorcycle on the chassis dynamometer in the operating state. Both the height unit and the depth unit are advantageously continuously adjustable so that an optimum position for a measurement can be formed between the flow unit and the motorcycle on the chassis dynamometer in the operating state. The flow unit can be used for a plurality of different motorcycles on the chassis dynamometer with the help of the positioning unit. The height unit advantageously has a hinge design, by means of which the height of the flow unit can be adjusted. The height unit can be adjusted in particular by hand or by means of an electric motor. The depth unit is advantageously formed as a sliding unit or as a rolling unit, wherein the flow unit has in particular two sliding surfaces or a roller system. The sliding surfaces are in particular advantageously made of a metallic material as this Is corrosion-resistant and has a smooth surface. The rollers are advantageously made of a hard rubber and the rolling surface of a metallic material to form a reliable and even roll.

The height and/or depth unit further has/have locking units to fix the position of the flow unit. The locking units can form a positive and/or non-positive connection between a moveable and stationary part of the positioning unit, in particular a clamp, a screw connection or a groove-hub connection.

A method according to the invention for the inflow of gas towards a motorcycle with a combustion engine on a chassis dynamometer has the following steps:
  stationary acceleration of a motorcycle on a chassis dynamometer and measurement of the peripheral speed of the rear wheel of the motorcycle;
  generating a flow of gas towards the motorcycle, wherein the gas is accelerated and compressed such that its speed corresponds to the peripheral speed of the rear wheel when it exits the chassis dynamometer.

In one embodiment of the invention, the method further has at least one of the following steps:
  generating a laminar flow of the inflow gas after the gas has been accelerated and compressed;
  filtering the gas before the gas is accelerated and compressed;
  generating control signals for a device for accelerating and compressing the gas and controlling a drive unit for accelerating and compressing a gas as a function of the peripheral speed of the rear wheel;
  positioning the gas flow in relation to the motorcycle on the chassis dynamometer.

The motorcycle is advantageously moved to an operating state in which it is driven onto a mounting unit of a chassis dynamometer and fastened there via at least one fastening unit. In doing so, the motorcycle is positioned in such a way that its rear wheel is arranged on a rotatably mounted roller. After the motorcycle is in the operating state, the chassis dynamometer is activated by a user via an operating unit. The rear wheel of the motorcycle is then accelerated in a stationary position and its peripheral speed, which is worked out by the rotational frequency of the roller, is calculated. Based on the calculated peripheral speed of the rear wheel of the motorcycle, a flow unit is controlled by the control unit in such a way that a gas with corresponding speed exits therefrom and simulates the airflow according to the peripheral speed. Within the flow unit, the control signals reach a motor, which forms a drive unit and converts electrical energy into kinetic energy. The kinetic energy is transferred to a diffuser with or without transmission. As soon as the diffuser is rotated, its geometry creates a gas flow. A gas surrounding the chassis dynamometer or a gas supplied from a pipe is sucked in at the centre of the diffuser via a filter unit which filters particles out of the gas and accelerates the gas in the process. The gas at the centre of the diffuser then flows outwards along a plurality of vanes of the diffuser. Due to the widening cross section formed by the vanes, the speed of the gas is reduced and its pressure increased. After the gas exits the diffuser, it flows into the environment via an outflow unit. Inside the outflow unit, the gas flow is calmed in particular by a laminar filter, which reduces turbulent flows within the gas flow. After the gas flow has exited the outflow unit, the latter is designed such that the gas flow flows into the airbox of the motorcycle on the chassis dynamometer in the operating state in a targeted manner and produces a dynamic pressure there. The sampling rate for adjusting the speed of the exiting gas with respect to the peripheral speed is at least 0.5 seconds, advantageously 0.3 seconds, particularly advantageously 0.1 seconds.

Figure 2:
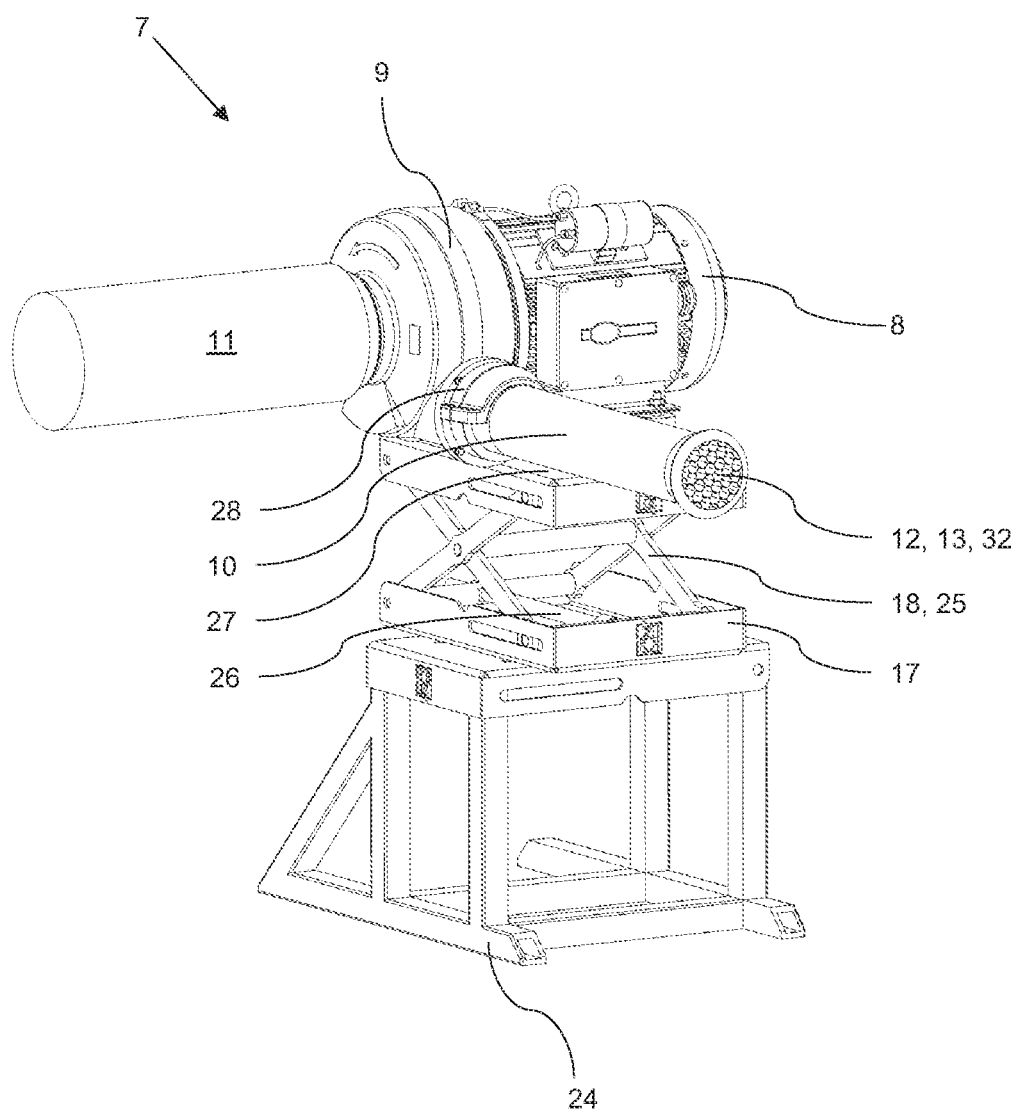
Figure 3:
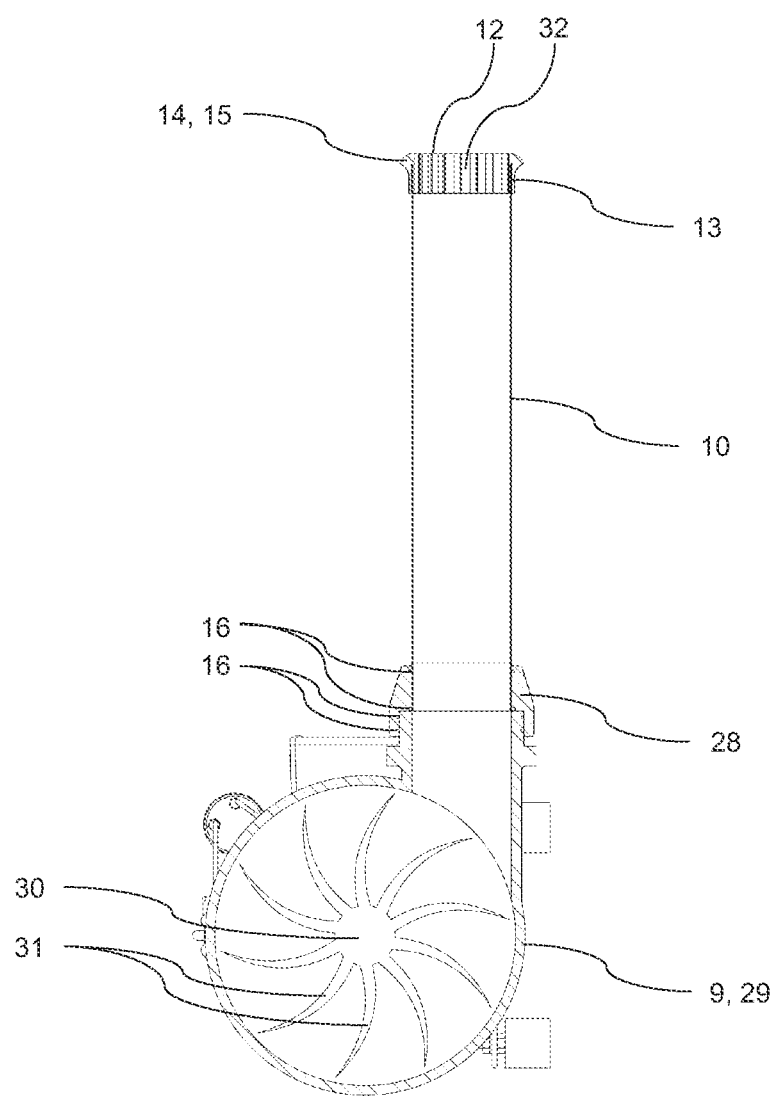

The invention is outlined in more detail below by means of the figures based on an exemplary embodiment, wherein FIG. 1 shows a perspective view of the chassis dynamometer, FIG. 2 shows a perspective detail view of the flow unit, FIG. 3 shows a sectional view of the diffuser and outflow unit.

FIG. 1 shows a perspective view of the chassis dynamometer 1, wherein the chassis dynamometer 1 has a mounting unit 2, on which a motorcycle is arranged in a fixed position in the operating state. In order to fix the motorcycle in place, the mounting unit 2 has a fastening unit 3 for holding a front wheel of the motorcycle. Furthermore, the chassis dynamometer 1 has fastening units 3 in the form of fastening rings 20 arranged on the mounting unit 2 and fastening straps 21 arranged thereon, by means of which the motorcycle can be firmly tensioned on the mounting unit 2 in the operating state. Fastening straps 21 are advantageous as these enable any motorcycle to be fixed in place, regardless of its shape or size. The fastening straps 21 can be tensioned between the motorcycle and the mounting unit 2. The mounting unit 2 further has feet 22 for stability, wherein the feet 22 can advantageously be adjusted in height in order to compensate for unevenness on a floor (not illustrated) and thus guarantee stability. The mounting unit 2 is advantageously made of a sheet metal construction, which creates high strength and rigidity, but significantly reduces the weight compared to a solid metal unit. In an operating state, the rear wheel of the motorcycle is on a roller 6, which partly protrudes beyond the mounting unit 2 and the axis of rotation of which is accommodated within the mounting unit 2 in order to simplify the height difference between the front wheel and rear wheel of the motorcycle and the mounting of the motorcycle on the mounting unit 2. An operating unit 4 is also arranged on the mounting unit 2 via an articulated operating arm 23, wherein the operating unit 4 has a plurality of buttons, switches and a display. Independent of the mounting unit 2, two control units 2 and a flow unit 7 are arranged, wherein the flow unit 7 has, in addition to a platform 24, a positioning unit 17, as well as a filter unit 11, a non-visible drive unit 8, a diffuser 9 and an outflow unit 10, wherein the outflow unit 10 is directed at one front of the motorcycle on the chassis dynamometer 1 in the operating state. The diameter of the outflow unit 10 is at least as large as an opening of an airbox of a motorcycle on the chassis dynamometer in the operating state. The flow unit 7 can be adapted to the mounting unit 2 as required and can be used individually due to its independent stand.

FIG. 2 shows a perspective detail view of the flow unit 7, wherein the platform 24 raises the flow unit 7 to an appropriate base height and the positioning unit 17 has a height unit 18 and a non-visible depth unit 19, wherein the height unit 18 is formed via an X-shaped joint 25 and the angle between the legs of the X-shaped joint 25 and thus the height of the flow unit 7 is adjustable by means of a threaded rod 26. The depth unit 19 is advantageously formed by a non-visible sliding unit, wherein the distance between the flow unit 7 and the motorcycle on the chassis dynamometer 1 in the operating state can thereby be adjusted. On an upper base 27 of the positioning unit 17, the flow unit 7 has the drive unit 8 in the form of an electric motor as well as a rotationally connected and concentrically arranged diffuser 9, on which a filter unit 11 in the form of a cartridge filter is concentrically arranged. Substantially orthogonal to the filter unit 11, an outflow unit 10 is arranged circumferentially on the diffuser 9, wherein the outflow unit 10 has a circular cross section and is arranged on the diffuser 9 via a flange 28. The outflow unit 10 advantageously has a straight length without curves in order to keep the flow loss within the outflow unit 10 as low as possible and minimize turbulent flows. A laminar filter 12 is arranged at one end 13 of the outflow unit 10, wherein said filter 12 has a plurality of passage openings 32 with honeycomb cross sections. At least one non-visible seal unit 16 is respectively arranged between the filter unit 11 and diffuser 9 and between the diffuser 9 and outflow unit 10.

FIG. 3 shows a sectional view of the diffuser 9 and outflow unit 10, wherein the diffuser 9 has a diffuser housing 29 and a diffuser wheel 30, which has an outwardly increasing cross section between its vanes 31. The distance between the vanes 31 and the diffuser housing 29 should advantageously be selected to be as small as possible in order not to allow dead spaces with regard to the gas flow. After the gas enters centrally via the filter unit 11 (not shown) onto the diffuser wheel 30, It is conveyed outwards by its rotation and finally into the outflow unit 10. The outward expansion of the cross section between the diffuser wheels 30 reduces the gas speed and increases the gas pressure. The outflow unit 10 accommodates the laminar filter 12 at is end 13, wherein said filter 12 has a plurality of passage openings running in the direction of flow of the gas and a curved surface 15 at a housing outlet end 14 to minimize turbulent flows when a gas flow exits the outflow unit 10. The outflow unit 10 is further arranged on the diffuser 9 via a flange 28. Two seal units 16 in the form of sealing rings are respectively arranged between the flange 28 and diffuser 9 as well as between the flange 28 and outflow unit 10. The outflow unit 10 is formed as a metal or plastic pipe and has a circular cross section.

REFERENCE LIST

1 Chassis dynamometer
2 Mounting unit
3 Fastening unit
4 Operating unit
5 Control unit
6 Roller
7 Flow unit
8 Drive unit
9 Diffuser
10 Outflow unit
11 Filter unit
12 Laminar filter
13 End
14 Housing outlet end
15 Curved surface
16 Seal unit
17 Positioning unit
18 Height unit
19 Depth unit
20 Fastening rings
21 Fastening straps
22 Feet
23 Operating arm
24 Platform
25 Joint
26 Threaded rod
27 Upper base
28 Flange
29 Diffuser housing
30 Diffuser wheel
31 Vane
32 Passage opening

What is claimed is:

1. A chassis dynamometer (1) for motorcycles with a combustion engine, comprising:
   a mounting unit (2);
   at least one fastening unit (3);
   an operating unit (4);
   a control unit (5);
   a roller (6) for recording the peripheral speed of a motorcycle rear wheel; and
   a flow unit (7), which in turn has comprises:
      a drive unit (8);
      a diffuser (9); and
      an outflow unit (10) arranged downstream of the diffuser (9) in the direction of flow,
   wherein the diffuser (9) and outflow unit (10) form a flow channel carrying gas in the operating state, wherein the diffuser (9) is configured to be driven by the drive unit (8), wherein the control unit (5) controls the drive unit (8) as a function of the peripheral speed of the roller (6) in such a way that a speed of the gas emerging from the outflow unit (10) in the operating state is substantially equal to the peripheral speed at least from a peripheral speed of 150 km/h.

2. The chassis dynamometer (1) according to claim 1, wherein the flow unit (7) has a filter unit (11) arranged upstream of the diffuser (9) in the direction of flow, wherein the filter unit (11) and/or the outflow unit (10) is configured to be releasably connected to the diffuser (9).

3. The chassis dynamometer (1) according to claim 2, comprising at least one seal unit (16) arranged between the filter unit (11) and diffuser (9) and between the diffuser (9) and outflow unit (10).

4. The chassis dynamometer (1) according to claim 2, wherein the filter unit (11) is formed as a pleated element filter.

5. The chassis dynamometer (1) according to claim 1, wherein the outflow unit (10) has a circular cross section and a length of at least 0.3 m.

6. The chassis dynamometer (1) according to claim 1, wherein the outflow unit (10) has a laminar filter (12), wherein the laminar filter (12) is arranged at an end (13) of the outflow unit (10) away from the diffuser (9), wherein the laminar filter (12) or the outflow unit (10) has a curved surface (15) at a gas outlet end (14).

7. The chassis dynamometer (1) according to claim 1, wherein the control unit (5) has a frequency converter, wherein the frequency converter is calibrated in a range of peripheral speed from 150 km/h to 350 km/h.

8. The chassis dynamometer (1) according to claim 1, wherein the flow unit (7) has a positioning unit (17), wherein the positioning unit (17) has a height unit (18) for adjusting the height and a depth unit (19) for adjusting a distance between the flow unit (17) and a motorcycle on the chassis dynamometer in the operating state.

9. A method for the inflow of gas towards a motorcycle with a combustion engine on a chassis dynamometer (1), having the steps:
   stationary acceleration of the motorcycle on the chassis dynamometer (1) and measurement of the peripheral speed of the rear wheel of the motorcycle;
   generating a flow of gas towards the motorcycle, wherein the gas is accelerated and compressed such that its speed corresponds to the peripheral speed of the rear wheel; and further having at least one of the following steps:
   generating a laminar flow of the inflow gas after the gas has been accelerated and compressed;
   filtering the gas before the gas is accelerated and compressed;
   generating control signals for a device for accelerating and compressing the gas and controlling a drive unit (8) for accelerating and compressing a gas as a function of the peripheral speed of the rear wheel; and
   positioning the gas flow in relation to the motorcycle on the chassis dynamometer.

* * * * *